United States Patent [19]
Coupin et al.

[11] 3,906,267
[45] Sept. 16, 1975

[54] BRUSHLESS ELECTRIC MOTORS

[75] Inventors: Claude Coupin, Eaubonne; Alain Deval, Plaisir, both of France

[73] Assignee: Societe d'Applications Generales d'Electricite et de Mecanique, France

[22] Filed: May 16, 1974

[21] Appl. No.: 470,590

[30] Foreign Application Priority Data
July 26, 1973 France .............................. 73.27485
Mar. 29, 1974 France .............................. 74.11467

[52] U.S. Cl............... 310/68 R; 310/156; 310/168; 310/268; 310/126; 318/254
[51] Int. Cl.² ......................................... H02K 11/00
[58] Field of Search ..................... 310/49, 162–165, 310/156, 168, 268, 112, 119, 126, 68 R, 68 A–68 D; 318/138, 254

[56] References Cited
UNITED STATES PATENTS

| | | | |
|---|---|---|---|
| 286,247 | 10/1883 | Wolcott .............................. | 310/268 |
| 3,261,998 | 7/1966 | Bosco, Jr. et al. ................... | 310/126 |
| 3,343,014 | 9/1967 | Giles ................................. | 310/49 R |
| 3,348,086 | 10/1967 | Monma............................... | 310/268 |
| 3,467,844 | 9/1969 | Bird .................................. | 310/114 X |
| 3,840,761 | 10/1974 | Muller ............................... | 310/268 X |
| 3,845,339 | 10/1974 | Merkle et al. ...................... | 318/254 X |

FOREIGN PATENTS OR APPLICATIONS
1,563,418   5/1970   Germany

*Primary Examiner*—Donovan F. Duggan
*Attorney, Agent, or Firm*—Larson Taylor and Hinds

[57] ABSTRACT

A D.C. brushless electric motor comprises a stator and a rotor. The rotor has two side cheeks arranged at the two sides of the stator in the axial direction, each having $n$ teeth of like polarity ($n$ being an integer greater than 1). The power winding comprises $2n$ clusters of radially directed electrical conductors and the axis of each cluster is offset electrically by 180° from that of the preceding cluster. The clusters are connected so that two successive clusters are traversed by currents flowing in the opposite directions. The power winding is embedded in an insulating annulus of moulded material. The stator additionally carries detection means (such as an additional winding) which are offset from the clusters electrically through 90°.

10 Claims, 9 Drawing Figures

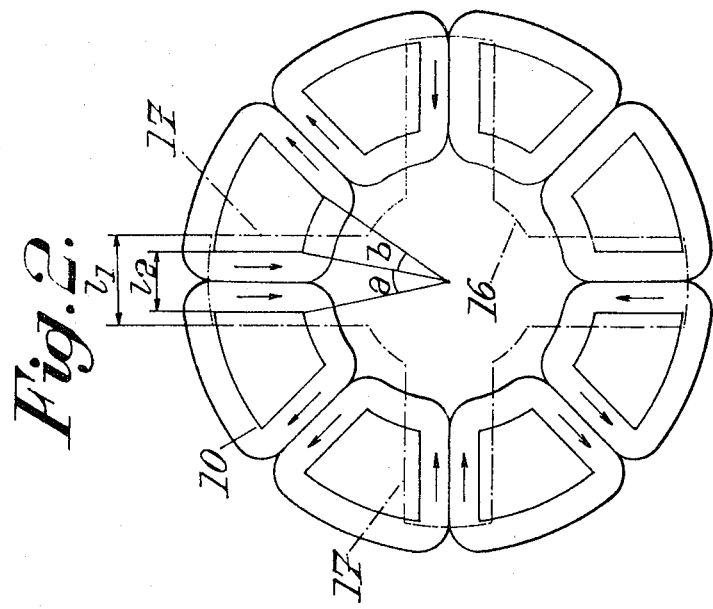
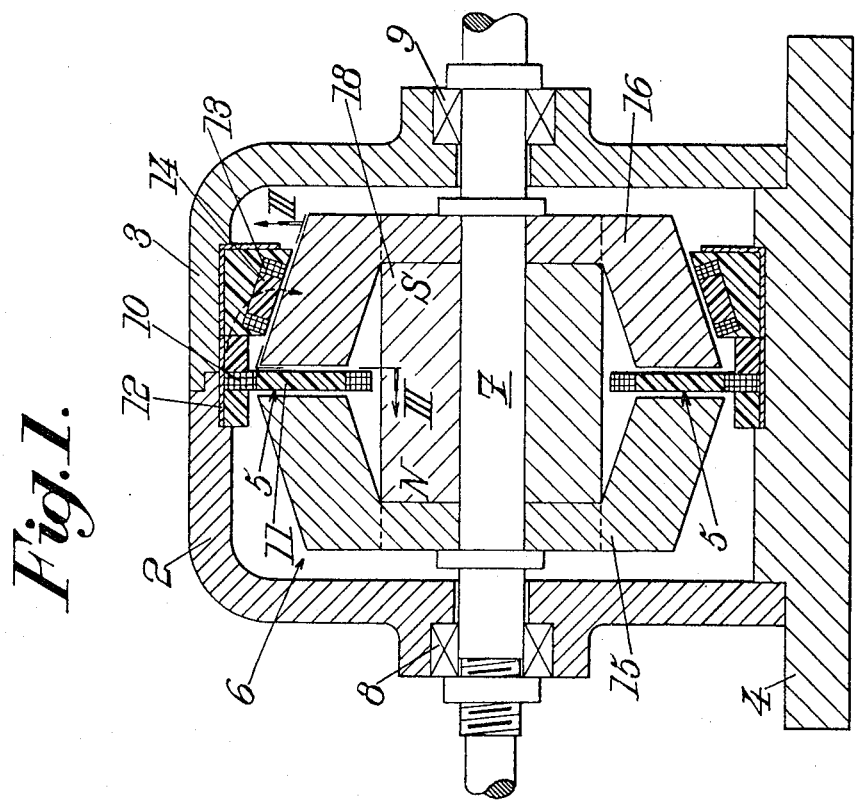

BRUSHLESS ELECTRIC MOTORS

BACKGROUND AND SUMMARY OF THE INVENTION

The present invention relates to direct current electric motors, more particularly so-called electronic commutation or brushless motors.

Conventional electronics commutation motors are known whose rotor consists of a permanent magnet which is placed around a stator which has a pair of windings on a magnetic body. One of the windings is used for detection and control, whilst the other is used for driving the motor. The lines of magnetic force generated by the magnet of the rotor are directed radially in the air gap between the stator and the rotor.

This arrangement has certain drawbacks. The large size rotating magnet cannot be made of high magnetic energy material due to the high rotating speed since such materials are relatively fragile. Moreover, when there are a large number of poles, the magnetic losses are substantial since part of the lines of magnetic force close without passing through the power windings.

There is disclosed in French Patent 1 585 744 an alternator comprising a stator provided with a winding with $2n$ clusters of radially directed conductors, and a rotor comprising two toothed side cheeks arranged one on each side of the stator, the magnetic flux produced by a member disposed radially inwardly of the winding closing between these side cheeks and parallel to the axis of the assembly and through the winding. The winding is located in the notches of a magnetic circuit and the variations of reluctance in operation result in substantial losses due to eddy currents.

It is an object of the invention to provide an improved D.C. brushless electric motor. It is a more particular object of the invention to provide a motor in which the above-mentioned disadvantages are overcome.

According to the invention, a D.C. current brushless electric motor comprises a stator provided with a power winding and a rotor comprising two side cheeks of ferromagnetic material each having $n$ teeth of like polarity. The side cheeks are located one on each of the two sides of the stator in the axial direction and the magnetic flux provided by a member disposed radially inwardly of the winding is parallel to the motor axis between the teeth of the side cheeks. The power winding comprises $2n$ clusters of radially directed conductors, the axis of each cluster being offset electrically by 180° form that of the preceding cluster and the clusters being so associated so that two successive clusters are traversed by currents flowing in opposite directions. The winding is embedded in an insulating annulus of moulded material which holds the clusters in position and has substantially parallel faces confronting the teeth of the side cheeks for the input and emergence of flux, which flux does not traverse ferromagnetic material between the said teeth. The stator also carries magnetic field detection means which are electrically offset from the clusters of the power windings by 90°.

All the poles of a same polarity are thereby carried by one and the same side cheek. This arrangement means that the lines of the magnetic flux in the air gap between the side cheeks run parallel to the axis, reduces the magnetic losses (because the poles of a same polarity are on one side of the corresponding coil) and decreases the eddy current losses since the side cheeks rotate in a field in which the distribution remains substantially constant at all times. Moreover, this arrangement makes it possible to use relatively large rotating members, with a consequent high resistance to centrifugal force effects without introducing a substantial moment of inertia.

If the motor is designed for a high rotary speed, or if the member providing the magnetic flux is a winding, it may be advantegeous to make this member fast with the stator. In other cases this member can be a magnet which forms part of the rotor and is disposed between the side cheeks.

In practice, each cluster typically has an angular electrical amplitude of about 90°, with the corollary that the nearest conductors in adjacent clusters can likewise be at 90°.

The rotary assembly in accordance with the invention comprises detection means carried by the stator and offset electrically from the aforesaid clusters by 90° to enable the motor to be used as an electronic commutation motor, typically with a circuit of the type described and claimed in French Patent No. 2 112 679 assigned to the present applicants. These detection means may, in particular, be constituted by a detection winding in the form of coils embedded or sunk into the same annulus as the driving winding, but having a greater resistance because it is only required to collect a voltage signal. The detection winding could alternatively be embedded or carried in an independent annulus and be located in a position to be traversed by the migrant flux between the side cheeks.

Particular embodiments of electronic commutation motors according to the invention will now be described by way of example and with reference to the accompanying drawings.

SHORT DESCRIPTION OF THE DRAWINGS

FIG. 1 is a schematic vertical axial section of a motor in accordance with a first embodiment of the invention;

FIG. 2 is a diagrammatic front view of the power winding and of the side cheeks of the rotor (shown in chain dotted line) of the motor of FIG. 1;

Figure 3:
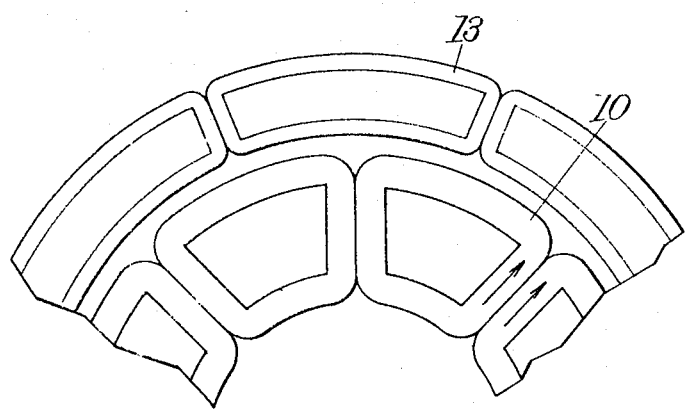
Figure 4:
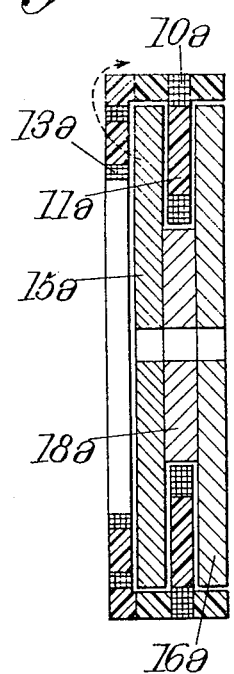
Figure 5:
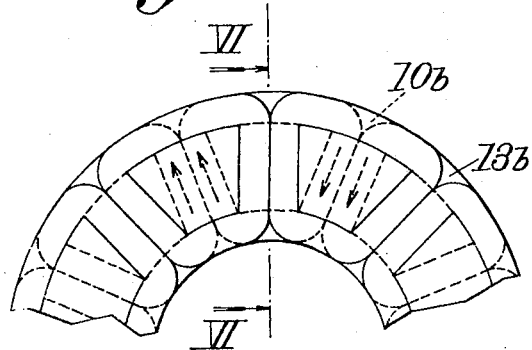
Figure 6:
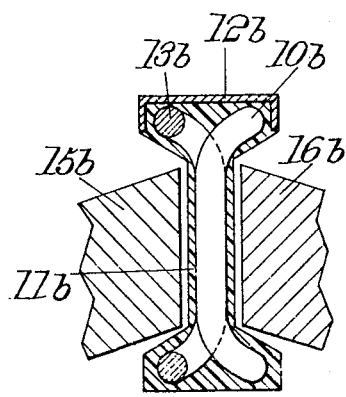
Figure 8:
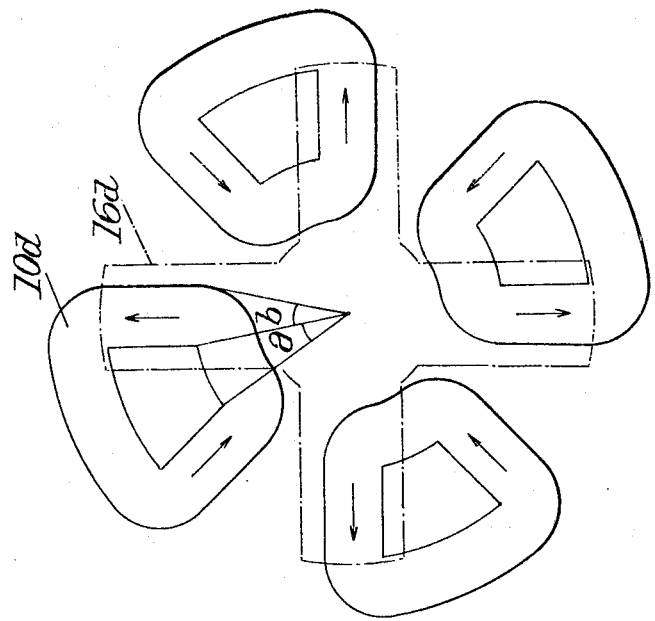
Figure 7:
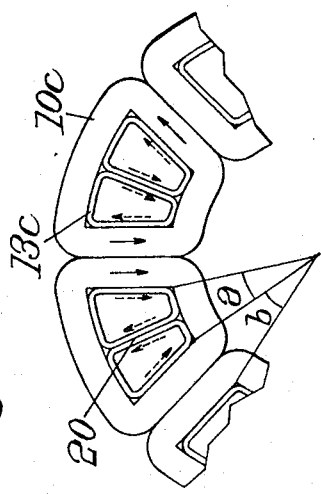
Figure 9:
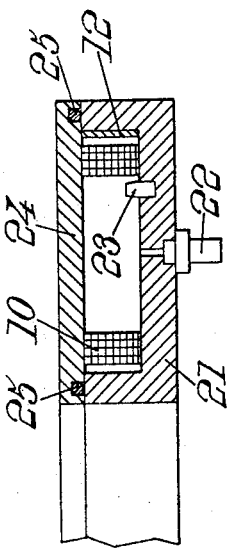

FIG. 3 diagrammatically illustrates the relative positions of the power and detection windings as viewed from line III—III of FIG. 1;

FIG. 4 is an axial section similar to that of FIG. 1 showing a second embodiment of the motor;

FIG. 5 is similar to FIG. 3 but shows a modified embodiment of the relative positioning of the power and detection windings;

FIG. 6 is a cut away diagrammatic section on the line IV—IV of FIG. 5 illustrating the relative positioning of the power and detection windings between the side cheeks;

FIG. 7, similar to FIGS. 3 and 5, shows another possible arrangement of the power and detection windings;

FIG. 8, similar to FIG. 2, shows another possible layout of the power winding;

FIG. 9 very diagrammatically illustrates a method of moulding of the annulus which contains the power winding.

DETAILED DESCRIPTION OF PREFERRED EMBODIMENTS

Referring to FIGS. 1 and 2, there is shown a motor which comprises a housing made up of two parts 2 and 3 which are rigidly connected by members (not illustrated) and are carried by a base plate 4. The stator 5 is mounted within the housing. The rotor 6 of the motor is carried by a shaft 7 rotatably supported by bearings 8 and 9 carried by the housing parts 2 and 3 and having a limited axial play.

The stator 5 does not include ferromagnetic material. It comprises a power winding 10 embedded in an annulus 11 of moulded material, for example commercially available epoxy resin. This annulus has two plane and parallel radial faces so arranged that the magnetic flux of the rotor will pass therethrough. In the embodiment illustrated, it has a T cross section with a minimal resin thickness over the driving or power winding 10 (about one tenth of a millimetre, at least in the case of small motors) opposite the rotor. The bar of the T projects on either side of the radially outer connecting wire portions of the winding.

The winding 10 may be regarded as comprising $2n$ radially directed clusters of conductors ($n$ being equal to 4 in the case illustrated in FIG. 2). Each of these clusters result from the juxtaposition of adjacent conductors in two adjacent coils. These coils may be successively wound on a former but without cutting the wire between them. One coil out of two is then reversed so that the currents are the same direction in the adjacent conductors of the two coils, as illustrated in FIG. 2. The annulus of moulded material is advantageously hooped by a ferrule 12 preferably of a nonferromagnetic material which is not a good electrical conductor, thereby to reduce the losses of the motor as far as possible.

A satisfactory power weight output is obtained with a power winding 10 as illustrated in FIG. 2 when the electrical angles $a$ and $b$ are each of about 90°, with a ratio of the internal and external diameters of the winding of about ½.

The stator of the motor illustrated in FIG. 1 also comprises a detection winding 13 which may be considered as made up of clusters connected by peripheral outer and inner conductor parts, the clusters of the detection winding 13 being electrically out of phase by 90° (or an odd multiple of 90°) relatively to the clusters of the power winding 11. In the embodiment of FIGS. 1–3 the detection winding 13 is embedded in a second annulus 14 which may be applied against that of the power winding 11 and be held by ferrule 12 which hoops the latter, or by separate ferrule. The detection winding 13 is traversed by a fraction of the migrant flux of the motor as indicated by the arrows in dash lines in FIG. 1.

The rotor 6 comprises two identical solid cheeks 15 and 16 which are secured to the shaft 7, for example by welding or keying, this shaft being of a material with a high saturation point (for example an iron-cobalt alloy in the case of small power motors). An annular magnet 18 is held between the cheeks 15 and 16. EAch cheek comprises, in the embodiment illustrated, four teeth 17 at a spacing of 90° from one another in the circumferential direction and each having an annular width slightly more than that of a cluster of the power winding 10. A ratio $l_1/l_2$ of about 1.5 typically gives good results.

The cheeks 15 and 16 of the motor illustrated in FIG. 1 have turned-down teeth, which are arranged so as to accommodate a magnet 18 of adequate length. This arrangement allows for the use of a conventional magnet 18 for example of material known under the Trade Mark "TICONAL". In this instance there will be a gap of the order of ⅛ of the length of the magnet 18 between opposed teeth of the side cheeks. The thickness of the embedded power winding will occupy about 80% of the width of the air gap between the teeth of the cheeks.

It will be observed that the detection winding 13 will deliver a signal which in practice is not influenced by the currents passing through the power winding 10, due to the electrical phase displacement of 90°. This detection signal is appropriate to electronic control using one of the circuits described and claimed in French Patent No. 2 112 679 mentioned above, whose content is incorporated to the present specification by way of reference.

The motor whose stator and side cheeks are illustrated in FIG. 4 (where parts corresponding to those of FIGS. 1–3 are designated by the same reference numeral with an $a$ mark added thereto), has a magnet 18$a$ of very high magnetic energy material (for example Samarium-cobalt) which can therefore be of small length and allow for the use of flat cheeks 15$a$ and 16$a$. The thickness of the motor can thus be very much less than that of the motor of FIG. 1 for a predetermined output power. In such a motor, the detection winding 13$a$ may be parallel to the power winding 10$a$. Since a major portion of the migrant magnetic flux will pass through the outermost part of the teeth in the radial direction it will be advantageous to give the winding 13$a$ a radial size less than that of the winding 10$a$ and to locate it level with the outer portion of the teeth.

Instead of being located in the migrant magnetic flux, the detection winding 13$a$ may be arranged at a location whereby it will be traversed by the same flux as the power winding. In the embodiment of FIGS. 5 and 6, where the parts corresponding to those of FIG. 1 carry the same reference numerals with a $b$ mark, the detection winding 13$b$ (in dash lines in FIG. 5) comprises wire clusters identical to those of the power winding 10$b$. However, it could be composed of wire of smaller diameter since it is only required to put out a voltage signal which will subsequently be amplified. In this instance the circumferential external and internal connections from each cluster to the next cluster are offset axially towards the cheek 16$b$ in the case of winding 10$b$ and towards the cheek 15$b$ in the case of winding 13$b$, to cater for criss-crossing of the two windings.

A solution which is made simpler by avoiding the need for bending the radially outer and inner portions of the coils is illustrated in FIG. 7. The power winding 10$c$ has the same constitution as in FIG. 1 and the detection winding 13$c$ comprises 8$n$ cluster halves which are made up of coils disposed within the interior of the coils constituting the winding 10$c$ and connected in such a way as only to deliver the electromotive force of the clusters having their axes phased electrically at 90° to the axes of the clusters constituting the power winding. The slight decrease in the output which is due to the increased proportion of harmonics in the detection signal only partially eliminated by the integrator is overbalanced by the simplicity of the arrangement.

Referring to FIG. 8, there is shown another modified embodiment illustrated by FIG. 8. The power winding 10$d$ comprises clusters each belonging to a single coil. Here again it is in general of advantage to make the angles $a$ and $b$ of the same order of amplitude, with $a + b$ equal to 180° electrically. In this instance all the coils are wound in the same sense.

The winding 10d in the case of FIG. 8 is slightly simpler than that of FIGS. 1 and 4. On the other hand, the Joule losses in the winding and the bulk of the motor in the radial direction are increased to some degree.

The stator of the motor illustrated in FIG. 1 may be built as follows: the coils of winding 10 are made in continuous fashion and disposed in a mould 21 provided with an injection fitting 22 (FIG. 9). This mould is provided internally with holes to receive pins 23 for centering the coils. These pins may be made of the resin which is used to impregnate and do the moulding, in the polymerized condition. Alternatively use could be made of pins of a material which does not adhere to the moulding product (for example polytetrafluorethylene). In this second instance the pins may be provided with a taper to facilitate their removal. In the case of small power motors, the internal dimensions of the mould are advantageously such as to allow for play of about one millimetre in the radial direction between the internal face of the mould and the ferrule 12 when it is initially placed in its outer status. In the axial direction the winding 10 may be placed directly against the bottom of the mould. This mould is then closed by means of a cover 24 provided with a sealing O-ring 25 and with vent orifices. The resin to which a polymerization accelerator has been added is then injected. After polymerization the annulus so formed may be placed in the stator and the assembly of the motor finished in the usual way. The housing of the motor does not apply directly against the resin because of the existence of the ferrule.

The invention provides an electronic commutation motor which has a relatively high output (due to reduction in losses), a high torque, and this at a relatively small cost since setting up of the rotor does not require a great angular precision. The motor is capable of a very wide range of use, the rate of operation can be very high because the rotating parts are solid (in the case of small units 650 turns per second can be exceeded). This speed can be obtained under a hard vacuum, that is to say in space conditions.

We claim:

1. A D.C. brushless electric motor comprising a stator provided with a coiled power winding and a rotor comprising two side cheeks of magnetic material each having $n$ teeth of like polarity, the side cheeks being arranged at the two sides of the stator in the axial direction and the magnetic flux provided by a member disposed radially inwardly the winding in the axial direction being closed parallel to the axis between the teeth of the side cheeks, wherein the power winding comprises $2n$ clusters of radially directed conductors, the axis of each cluster being offset electrically by 180° from that of the preceding cluster and the clusters being grouped so that two successive clusters are traversed by currents flowing in opposite directions, the said winding being embedded in an insulating annulus of moulded material which holds the clusters in position and has substantially parallel faces opposite the teeth of the side cheeks for the input and emergence of magnetic flux, which flux passes through non ferromagnetic material only between the said teeth, and that the stator carries detection means which are offset from the clusters of the power windings electrically through 90°.

2. A motor according to claim 1, characterized in that each cluster of the power winding has an angular amplitude of the order of 90° electrically and that the angular amplitude of each tooth is more than that of a cluster.

3. A motor according to claim 1, wherein the clusters are constituted by a winding having $2n$ adjacent coils, two successive coils being wound in opposite senses and each cluster being made of adjacent radial conductors of two successive coils.

4. A motor in accordance with claim 1, wherein the clusters are constituted by a winding having $n$ coils, each cluster being constituted by the radial conductors disposed on one side of the coils.

5. A motor in accordance with claim 1, wherein the detection means comprise a winding similar to the power winding and embedded in the same insulating annulus, the clusters of the detection winding being electrically offset by 90° from the clusters of the power winding and the peripheral connecting conductors between the clusters being axially offset in opposite senses as between the power winding and the detection winding.

6. A motor in accordance with claim 1, wherein the detection means comprise a second winding embedded in an annulus of moulded insulating material which is fast with the stator of the machine and so disposed as to have the migrant flux from one of the side cheeks passing therethrough.

7. A motor in accordance with claim 1, wherein the detection means comprise a winding with $8n$ semiclusters, constituted by coils placed between the clusters of the power winding, and connected and grouped so as to provide $2n$ only active clusters offset electrically by 90° from the clusters of the driving winding.

8. A motor in accordance with claim 1, wherein the member which produces the magnetic flux is an annular magnet rigidly connected to the side cheeks.

9. A motor in accordance with claim 1, wherein the teeth of the side cheeks are bent inwardly of the machine in the axial sense.

10. A motor is accordance with claim 1, wherein the side cheeks are flat and the member which produces the magnetic flux is a magnet of high magnetic energy material which is fast with the side cheeks.

* * * * *